United States Patent Office 2,869,254
Patented Jan. 20, 1959

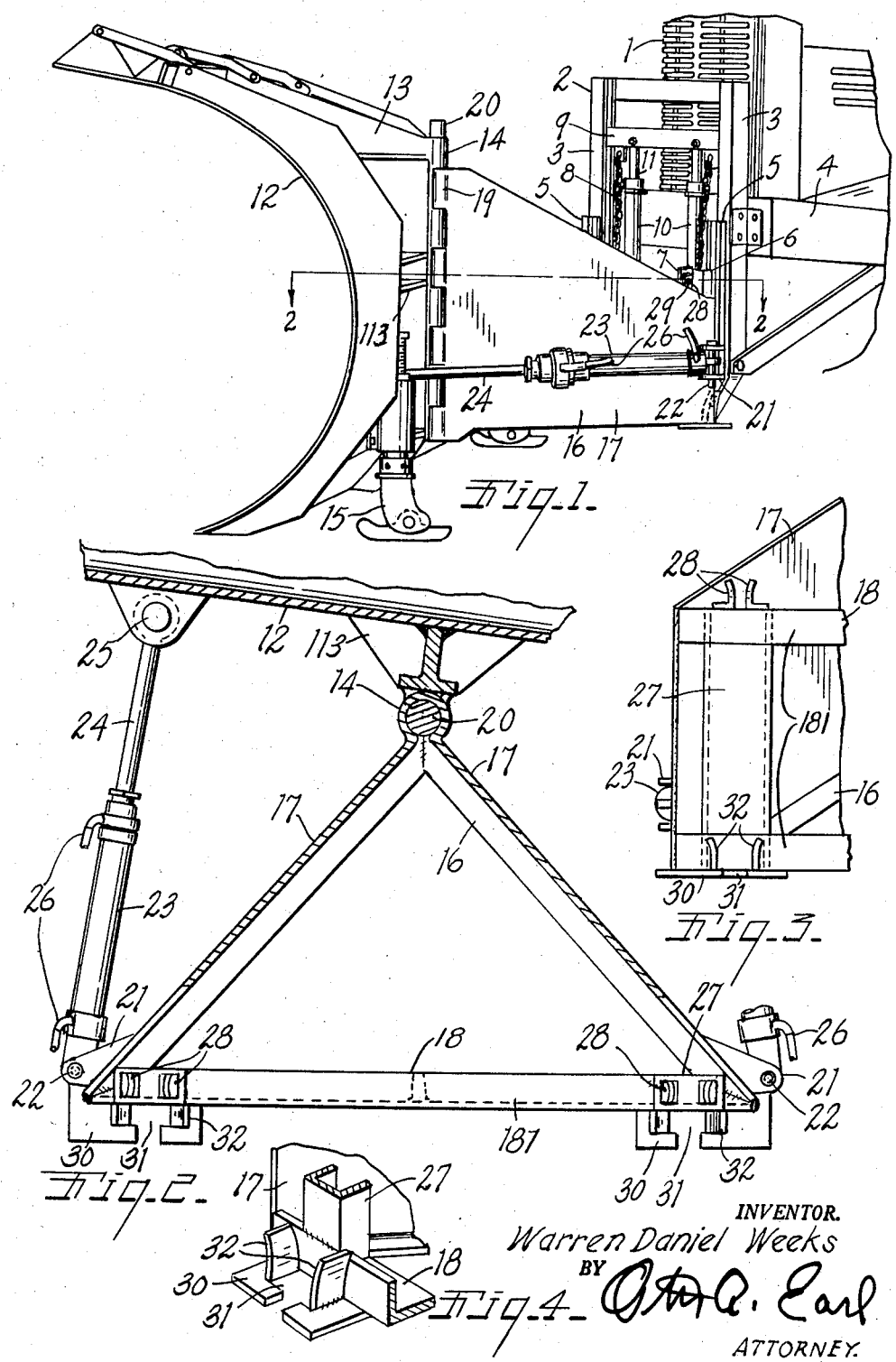

2,869,254

SNOW PLOW MOUNT FOR A RADIALLY SWINGABLE SNOW PLOW

Warren Daniel Weeks, Kalamazoo, Mich., assignor to Root Spring Scraper Company, Kalamazoo, Mich., a corporation of Michigan Application April 29, 1954, Serial No. 426,348

4 Claims. (Cl. 37—42)

This invention relates to improvements in snow plow mount for a radially swingable snow plow.

The principal objects of this invention are:

First, to provide a support for a radially swingable snow plow which will be sufficiently rugged to transmit high thrust loads to the plow and at the same time will permit easy radial swing or adjustment of the plow on the mount.

Second, to provide a mount for a radially swingable plow which engages the plow on a single vertical axis which forms the axis of adjustment of the plow and the line of thrust connection between the plow and the mount.

Third, to provide a mount for a laterally adjustable snow plow which utilizes two oppositely acting fluid pressure cylinders located on opposite sides of the axis of adjustment of the plow for readily adjusting the plow.

Fourth, to provide a mount and snow plow radially swingably connected thereto which mount in turn is easily and releasably connected to a vertically adjustable support or a truck so that the plow and mount can be dismounted from the truck.

Other objects and advantages of the invention will be apparent from a consideration of the following description and claims.

The drawings, of which there is one sheet, illustrate a highly practical form of plow and mount.

Fig. 1 is a perspective view of the plow and mount operatedly connected to a vertically adjustable support on a truck or other prime mover.

Fig. 2 is a fragmentary horizontal cross sectional view through the plow and mount taken along the plane of line 2—2 of Fig. 1.

Fig. 3 is a fragmentary rear elevational view of one corner of the plow mount.

Fig. 4 is a fragmentary perspective view of the lower rear corner of the plow mount.

The truck or other prime mover indicated in part at 1 is provided with an implement frame 2 having vertical side uprights 3 that are bolted to the front cross bar or bumper 4 of the vehicle. A pair of the vertically extending rails 5 of I-beam cross section are welded to the front of the frame members 3 and form guide rails for vertically reciprocable slides 6 of rearwardly facing channel-shaped cross section. The upper ends of the slides 6 are provided with vertical ears 7 adapted to be removably pinned to the plow mount, as will be described in greater detail presently.

The slide members 6 are vertically releasable or adjustable on the rails 5 by means of suspension chains 8 that connect the slides to a cross bar 9 which is slidable between the side uprights 3. A pair of hydraulic cylinders 10 having piston rods 11 connected to the cross bar function to raise the cross bar and the slides 6. The structure just described is an old type of plow mount and forms no part of the present invention, except as the plow mount is adapted to cooperate with this structure.

The plow illustrated consists of a forwardly concave plate or mold board 12 suitably reinforced on its back side with vertical and horizontal reinforced plates 13 and 113, respectively. The center reinforcing plate 13 is provided along its rear edge with vertically spaced tubular knuckles 14. Supporting shoes 15 are adjustably mounted toward the side edges of the plow, as is common in snow plows of this type.

The mount, which laterally swingably supports the plow 12, consists of a triangular framework 16 having solid side plates 17 and an open base 18 made up of structural angles and bars 181. The apex of the mounting frame is provided with vertically spaced knuckles 19 which are interlapped between the knuckles 14 on the plow and a hinge or pivot pin 20 extends through the knuckles 14 and 19 to connect the plow at the mounting frame.

Each of the side plates 17 of the mounting frame is provided near its rear edge with vertically spaced ears 21 which receive pins 22 connecting the rear ends of fluid actuating cylinders 23 to the mounting frame. The piston rods 24 of the cylinders extend forwardly and are pivotably connected as at 25 to suitable ears provided at spaced points on the plow on opposite sides of the hinge pin 20. Fluid connections 26 for reversely actuating the cylinders 23 and piston rods 24 are provided and adapted to be connected to the hydraulic system and controls in the prime mover. It will be appreciated that by extending one piston rod and retracting the other the plow may be made to swing to one side or the other of the hinge pin 20, or may be centered parallel to the base of the mounting frame for straight pushing action.

The base 18 of the mounting frame includes vertical uprights 27 of forwardly faced channel-shaped cross section. The rear faces of the uprights 27 are spaced according to the spacing of the slide members 6 on the truck and are adapted to abut the slide members in thrust transmitting relation between the plow mount and the truck. The upper ends of the uprights 27 are provided with spaced and flared pairs of ears 28 that are apertured to receive mounting bolts 29 passed through the ears 7 on the slide members on the truck. The bolts 29 thus vertically support the mounting frame 16 from the vertically adjustable slide members.

Welded to the bottoms of the uprights 27 and bottom of the base 18 of the mounting frame are flat plates 30 having rearwardly opening notched recesses 31 therein. Flared guide plates 32 mounted at the sides of the recesses 31 function to guide the lower ends of the slides 6 into the recesses 31 when the plow mount is attached to the truck. Engagement of the lower ends of the slides 6 in the notched recesses 31 prevents the lower edge of the mounting frame 16 from pulling forwardly from the slides 6.

The triangular shape of the plow mount frame 17 provides a maximum thrust transmitting strength with a minimum of the structure and delivers the thrust force of the truck to the center of the plow where it is most needed. At the same time the single line of thrust application to the plow permits the plow to be swung laterally for plowing straight ahead or to either side of the line of travel. The oppositely acting fluid pressure cylinders permit easy adjustment of the plow by manipulation of the controls within the truck and the standard implement support on the truck permits vertical adjustment of the plow if desired. The mounting frame 17 is easily detached from the implement support on the truck and the truck may be used for work other than plowing snow when desired.

Obviously, the plow and plow mount may be made in any size and strength desired but the construction described is particularly adapted for heavy duty plowing with high horse power trucks or prime movers. A number of variations or modifications of the structure described can be made if desired without departing from the theory of the invention as defined in the claims.

Having thus described the invention, what is claimed as new and is desired to be secured by Letters Patent is:

1. A snow plow and mount therefor comprising a straight forwardly concave mold board having a vertical reinforced rib in the center thereof projecting rearwardly therefrom, a series of vertically and equally spaced alined knuckles formed on the rear of said flange, a triangular mounting frame having a plate curved centrally into a cylindrical portion with rearwardly diverging side plates extending therefrom, the apex of said cylindrical portion having a series of vertically and equally spaced alined knuckles formed thereon and interlapped with the knuckles on said plow, a hinge and thrust pin passed through the knuckles of said rib and said frame, ears projecting from the sides of said frame and located toward the rear thereof, fluid operated cylinders pivotably connected to said ears and having piston rods extending forwardly and pivotably connected to said plow on opposite sides of said hinge pin, laterally spaced uprights in the rear wall of said mounting frame and have rearwardly facing flat thrust faces, laterally spaced and apertured pairs of mounting ears on the tops of the said uprights adapted to receive connecting pins from vertically slidable implement supports, and horizontal plates projecting rearwardly from the base of said framework below said uprights and having notched recesses adapted to interlockingly receive the lower ends of said implement supports.

2. A snow plow and mount therefor comprising, a mold board having a vertical reinforced rib in the center thereof projecting rearwardly therefrom, a series of vertically and equally spaced alined knuckles on the rear of said flange, a triangular mounting frame having a plate curved centrally into a cylindrical portion with rearwardly diverging side plates extending therefrom, the apex of said cylindrical portion having a series of vertically and equally spaced and alined knuckles thereon and interlapped with the knuckles on said plow, a hinge and thrust pin passed through the knuckles of said rib and said frame, ears projecting from the sides of said frame and located toward the rear thereof, fluid operated cylinders pivotably connected to said ears and having piston rods extending forwardly and pivotably connected to said plow on opposite sides of said hinge pin, laterally spaced uprights in the rear wall of said mounting frame and having rearwardly facing flat thrust faces, laterally spaced and apertured pairs of mounting ears on the tops of the said uprights adapted to receive connecting pins from vertically slidable implement supports, and horizontal plates projecting rearwardly from the base of said frame work below said uprights and having notched recesses adapted to interlockingly receive the lower ends of said implement supports.

3. A mounting frame for attaching a snow plow to a vehicle comprising a plate folded along its mid-portion to provide upright rearwardly diverging sides with rearwardly declining upper edges, the folded edge of said plate being formed into hollow tubular shape and being cut away at longitudinally spaced points to form spaced hinge knuckles whereby coacting hinge kunckles on a plow blade may be fitted between the knuckles on the plate and swingably retained in place by a hinge pin extending axially through the several knuckles, an upright back frame connecting the rear edges of said plate, means reinforcing the rearwardly diverging sides of said plate, and mounting means on the rear of said back frame for releasably connecting said mounting frame to a vehicle.

4. A mounting frame for attaching a snow plow to a vehicle comprising a plate folded along its mid-portion to provide upright rearwardly diverging sides, the folded edge of said plate being formed into hollow tubular shape and being cut away at longitudinally spaced points to form spaced hinge knuckles whereby coacting hinge knuckles on a plow blade may be fitted between the knuckles on the plate and swingably retained in place by a hinge pin extending axially through the several knuckles, an upright back frame connecting the rear edges of said plate, and mounting means on said back frame for connecting said mounting frame to a vehicle.

References Cited in the file of this patent

UNITED STATES PATENTS

| | | |
|---|---|---|
| 1,997,001 | Lamb | Apr. 9, 1935 |
| 2,022,393 | Weeks | Nov. 26, 1935 |
| 2,160,595 | LeBleu | May 30, 1939 |
| 2,160,596 | LeBleu | May 30, 1939 |
| 2,651,121 | Shannon | Sept. 8, 1953 |